(12) United States Patent
Preston

(10) Patent No.: US 10,267,431 B2
(45) Date of Patent: Apr. 23, 2019

(54) VALVE OPERATOR ARM

(71) Applicant: Pacific Technical Equipment & Engineering Inc., Anaheim, CA (US)

(72) Inventor: Kirk Preston, Anaheim, CA (US)

(73) Assignee: Pacific Technical Equipment & Engineering Inc., Anaheim, CA (US)

( * ) Notice: Subject to any disclaimer, the term of this patent is extended or adjusted under 35 U.S.C. 154(b) by 0 days.

(21) Appl. No.: 15/259,837

(22) Filed: Sep. 8, 2016

(65) Prior Publication Data
US 2017/0067575 A1    Mar. 9, 2017

Related U.S. Application Data

(60) Provisional application No. 62/215,418, filed on Sep. 8, 2015.

(51) Int. Cl.
*F16K 31/46* (2006.01)
*F16K 37/00* (2006.01)

(52) U.S. Cl.
CPC .......... *F16K 31/46* (2013.01); *F16K 37/0041* (2013.01); *Y10T 137/6855* (2015.04)

(58) Field of Classification Search
CPC ...... F16K 31/16; F16K 31/46; F16K 37/0041; Y10T 137/6855
USPC ................. 137/343, 351, 899, 899.1, 899.4; 211/162; 251/291, 292
See application file for complete search history.

(56) References Cited

U.S. PATENT DOCUMENTS

| | | | | |
|---|---|---|---|---|
| 5,381,996 | A * | 1/1995 | Arnemann | F16K 31/12 137/554 |
| 5,570,581 | A * | 11/1996 | Preston | F16K 31/12 251/58 |
| 5,810,051 | A * | 9/1998 | Campagna | E03B 9/00 137/899 |
| 5,937,373 | A * | 8/1999 | Ferrar | E03B 1/02 702/113 |
| 6,009,905 | A * | 1/2000 | Arnemann | F16K 31/12 137/351 |
| 2004/0134674 | A1 * | 7/2004 | Skorez | E03B 9/08 173/192 |
| 2009/0267010 | A1 * | 10/2009 | Ferrar | B25J 5/007 251/231 |
| 2010/0038328 | A1 * | 2/2010 | Becklin | H05K 7/1421 211/26 |
| 2012/0138830 | A1 * | 6/2012 | Ferrar | F16K 31/12 251/248 |

* cited by examiner

*Primary Examiner* — Robert K Arundale
*Assistant Examiner* — Jonathan J Waddy
(74) *Attorney, Agent, or Firm* — Bond Schoeneck and King PLLC; David Nocilly

(57) ABSTRACT

A valve operator system having an arm for pivotal mounting to a vehicle and a valve operator head slidingly engaged with a track on the arm. The arm may be pivoted through a wide arc to easily reach a target valve, with the valve operator head easily slid into position. The valve operator head preferably includes a series of rollers that engage longitudinal rods positioned in the opposing rails of a track mounted to the arm. A single track on top of the arm may be used, or two tracks positioned on opposing side surfaces of the arm. Pins or a locking bolt may be used to affix the valve operator head in place once moved into the desired position above the target valve and the arm can be locking into position with a drum brake or locking pins.

8 Claims, 15 Drawing Sheets

US 10,267,431 B2

VALVE OPERATOR ARM

CROSS-REFERENCE TO RELATED APPLICATIONS

The present application claims priority to U.S. Provisional App. No. 62/215,418, filed on Sep. 8, 2015.

BACKGROUND OF THE INVENTION

1. Field of the Invention

The present invention relates to valve operators and, more particularly, to a valve operator arm providing a wide range of motion for a valve operator.

2. Description of the Related Art

Underground valves, such as those found in gas and water distribution systems, are typically opened and closed by high torque valve operators that can rotate the valve stems to open or close the valves. The valve operators are often mounted on vehicles and powered by hydraulic systems which provide the torque necessary to open and close the valve. In order to position the valve operator in the appropriate location, many valve operating systems use articulated arms that are pivotally mounted to the vehicle and that can be pivoted or extended into position. The systems often require expensive braking arrangements to prevent the articulated arms from bouncing and moving when the high torque operator is used and require complicated movement to properly position the valve operator head over the valve to be operated. Accordingly, there is a need for a robust system that can easily position a valve operator in virtually any location within reach of the vehicle without the need for complicated articulated arms and braking mechanisms.

BRIEF SUMMARY OF THE INVENTION

A valve operator system, comprising an arm pivotally attached to a mount, a track supported by the arm, a valve operator head slidingly engaged with the track. The track is preferably position along an upper surface of the arm. The arm includes a pin and the mount includes a plate having a series of holes that can accept the pin. The valve operator includes a second pin and the arm includes a longitudinal plate having a second series of holes corresponding to the second pin. The arm is thus pivotal about the mount through an arc described by the pivoting arm so as to be placed in position proximately to a target valve, and the valve operator head may be slid along the arm from a first position to a second position above a target valve. As a result, the valve operator head can be positioned over any valve location within the arc of the arm simply be swinging the arm into position and then sliding the valve operator head along the track of the arm until it is over the valve operator. The arm may be locked into position and the valve operator head may be locked into position along the arm.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
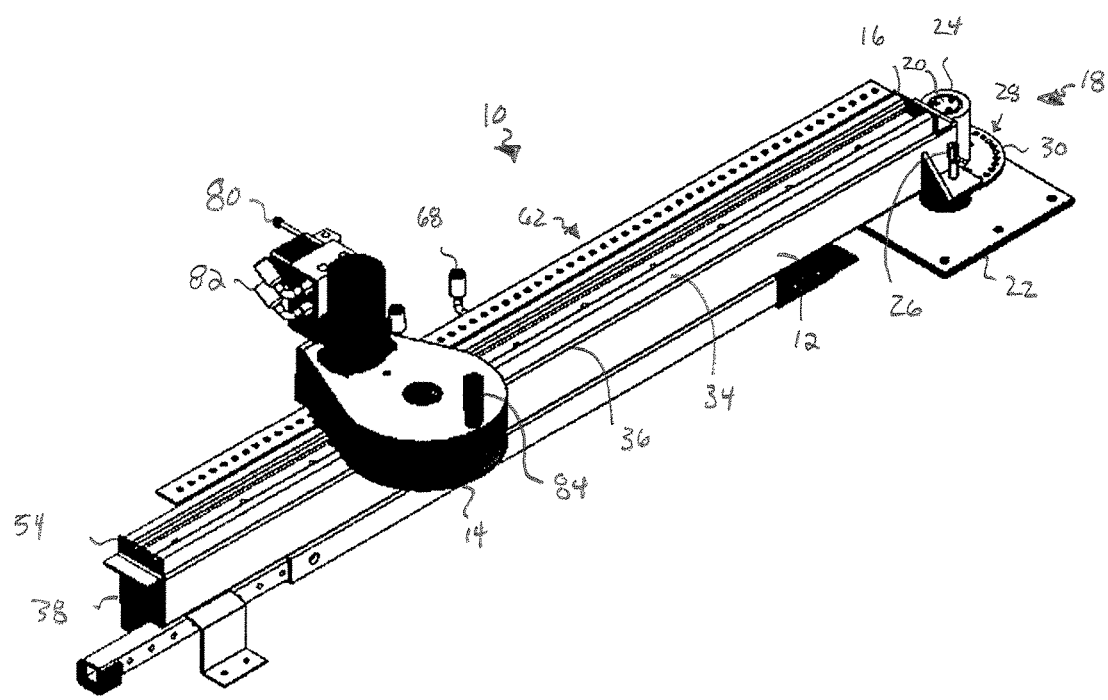
FIG. 1 is perspective view of a valve operator system according to the present invention.

Referring now to the drawings, wherein like reference numerals refer to like parts throughout, there is seen in FIGS. 1 through 8, a valve operating system 10 comprising an arm 12 and a valve operator head 14 slidingly interconnected to arm 12, such as by a track 34 as described more fully herein. One end 16 of arm 12 includes a mount 18 for pivotally attaching arm 12 to a utility vehicle, such as a truck or truck flatbed, and the entire length of arm 12 may be used to allow valve operator head 14 to be positioned above the access point of a target valve to be opened or closed using valve operator system 10.

Figure 9:
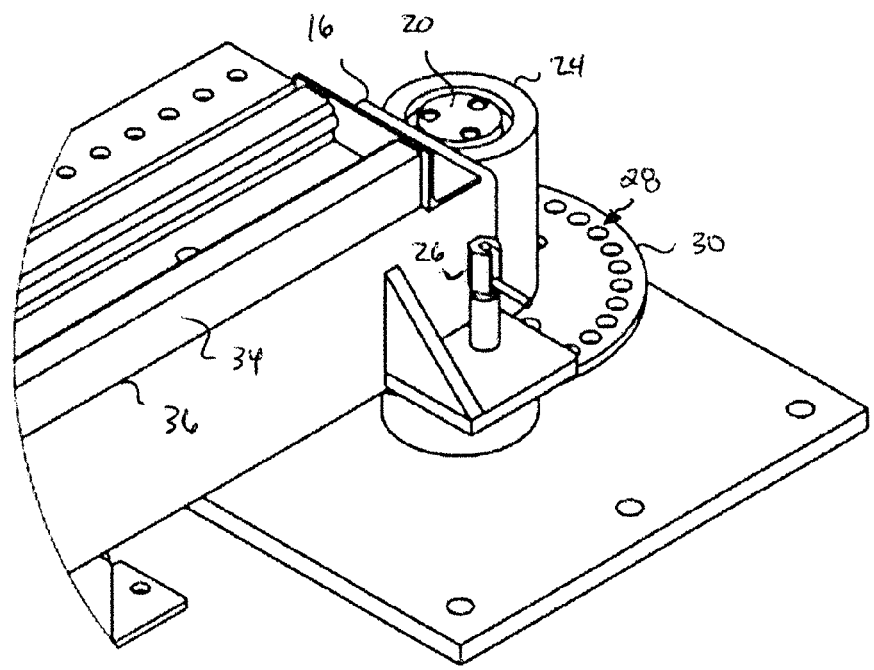
FIG. 9 is a perspective view of a mount for a valve operator system according to the present invention.
Figure 10:
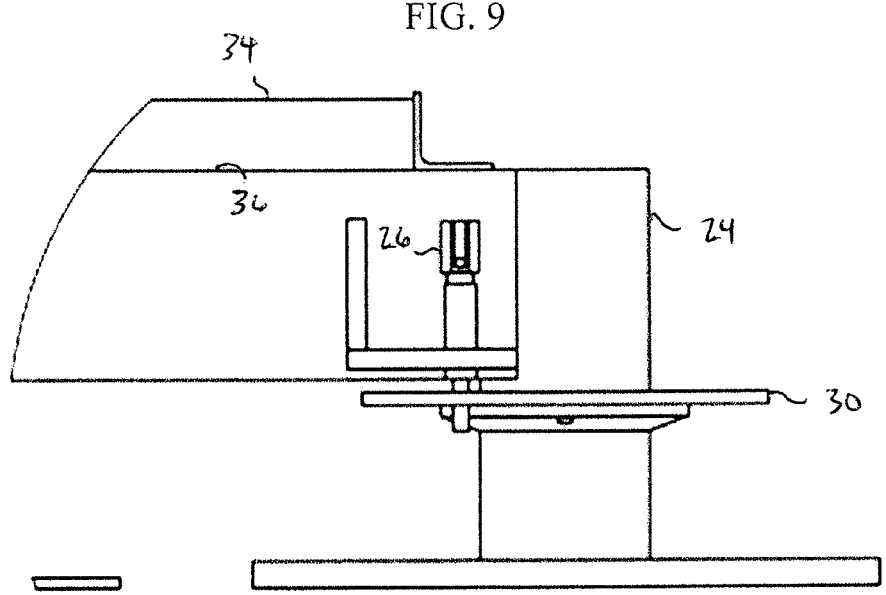
FIG. 10 is a side view of a mount for a valve operator system according to the present invention.

Referring to FIGS. 9 and 10, mount 18 comprises a central member 20 fixed to a mounting plate 22, and a ring 24 surrounding central member 20 and attached to arm 12 to allow for pivotal movement of arm 12 about central member 20. Arm 12 may include a pin 26 mounted thereto that is associated with a series of corresponding holes 28 formed in the outer perimeter of a plate 30 that is fixed relative to central member 20 of mount 18. When pin 20 is withdrawn, arm 12 is free to pivot from a first, stored position in a vehicle to a second, operating position where arm 12 has been extended over a target valve to be opened or closed by system 10. Once in position, arm 12 may be easily held in a closed position by allowing pin 26 to drop into one of the series of corresponding holes 28 in plate 30. It should be recognized that pin 26 could be biased into the closed position, such as by a spring, to ensure that arm 12 remains fixed in a particular position. In addition, the number and placement of holes 28 can be selected to define the desired scope of movement of arm 12. Pins 26 may be withdrawn from holes 28 via manual operation, or automatically using a solenoid or similar actuator that can be controlled remotely so that a user does not have to be standing next to mount 18.

Figure 2:
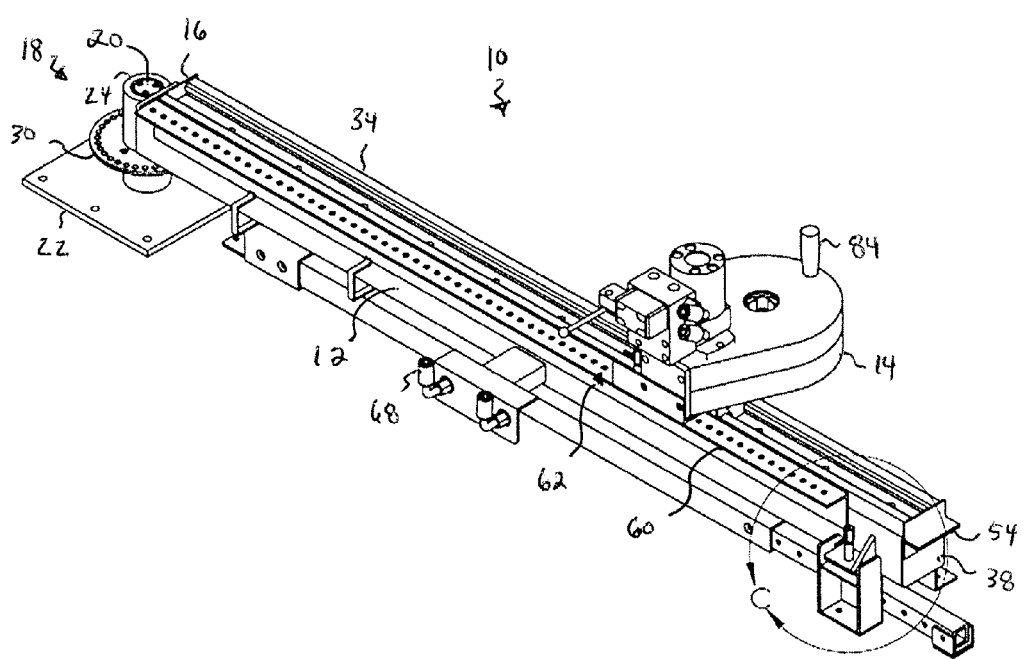
FIG. 2 is another perspective view of a valve operator system according to the present invention.
Figure 3:
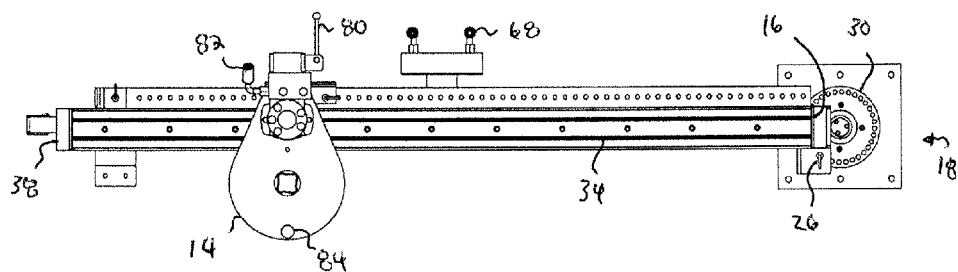
FIG. 3 is a top plan of a valve operator system according to the present invention.
Figure 4:
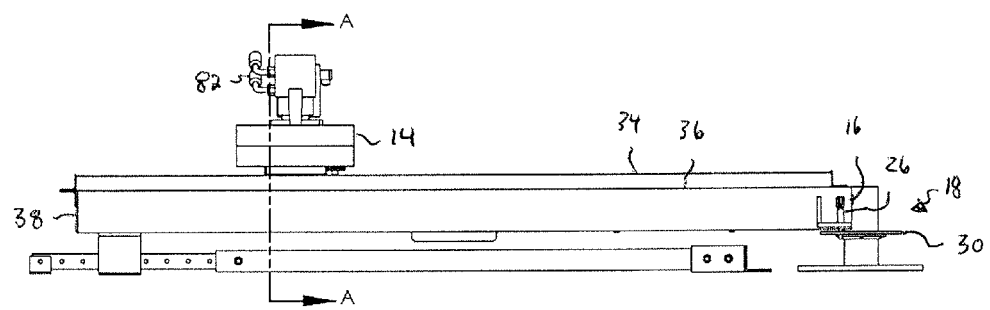
FIG. 4 is a first side view of a valve operator system according to the present invention.
Figure 5:
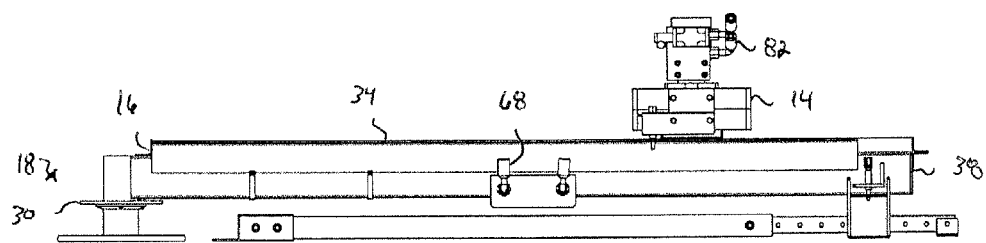
FIG. 5 is a second side view of a valve operator system according to the present invention.
Figure 6:
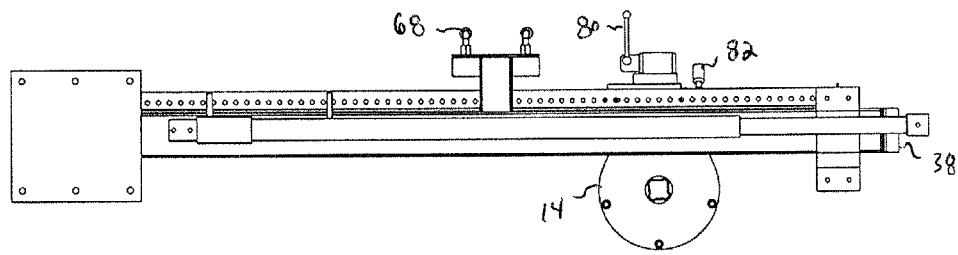
FIG. 6 is a bottom plan of a valve operator system according to the present invention.
Figure 7:
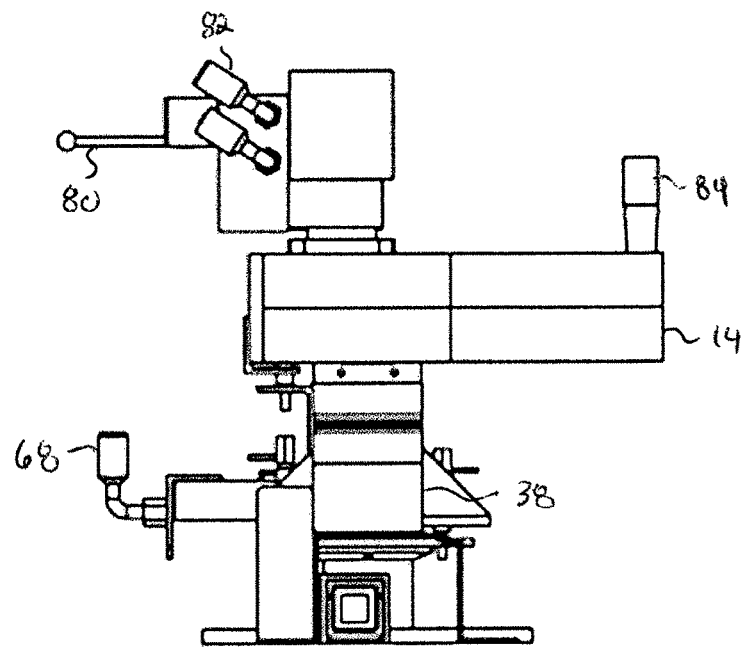
FIG. 7 is a front view of a valve operator system according to the present invention.
Figure 8:
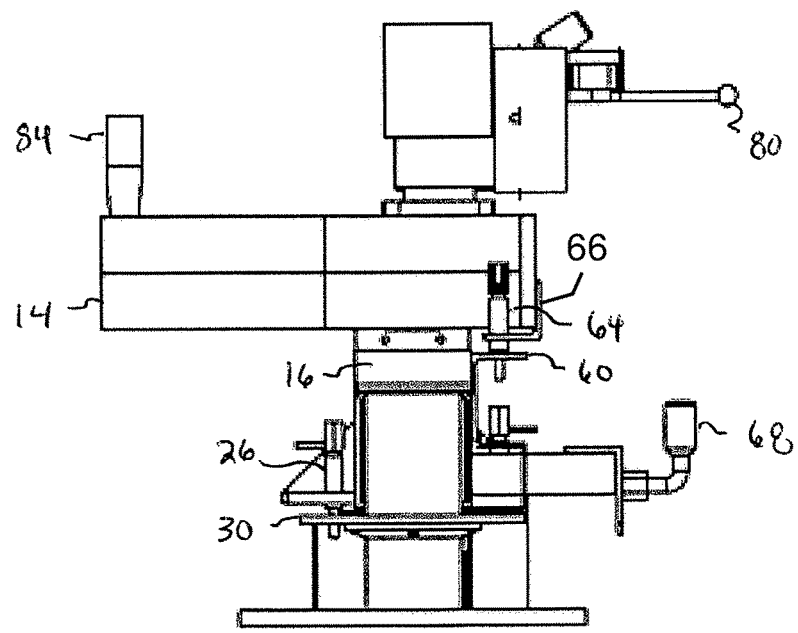
FIG. 8 is a rear view of a valve operator system according to the present invention.
Figure 11:
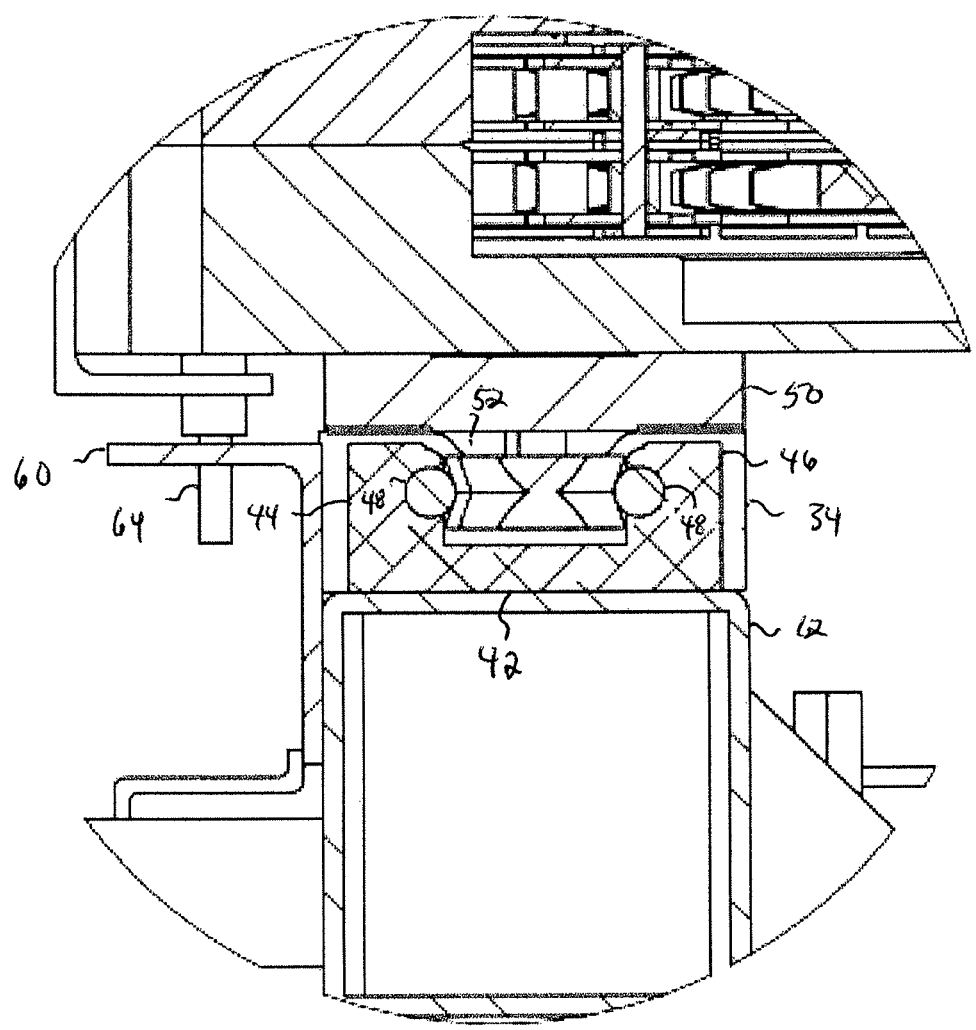
FIG. 11 is a cross-section of a valve operator system according to the present invention along line A-A of FIG. 4.
Figure 12:
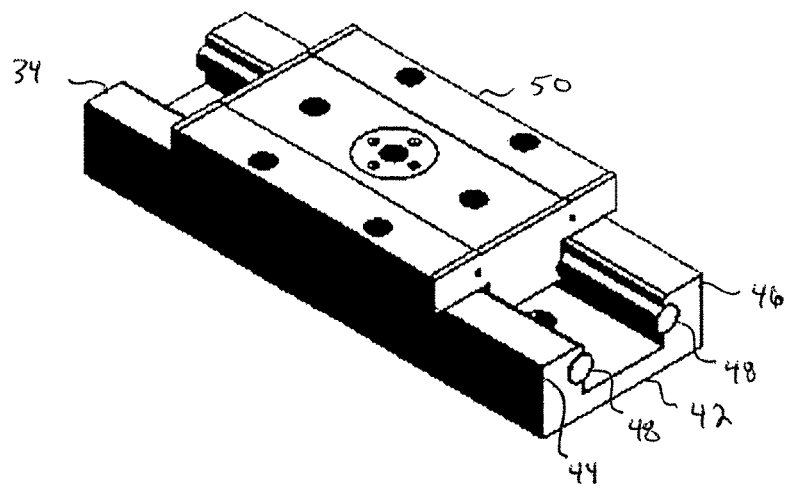
FIG. 12 is a pedestal for a valve operator system according to the present invention.
Figure 13:
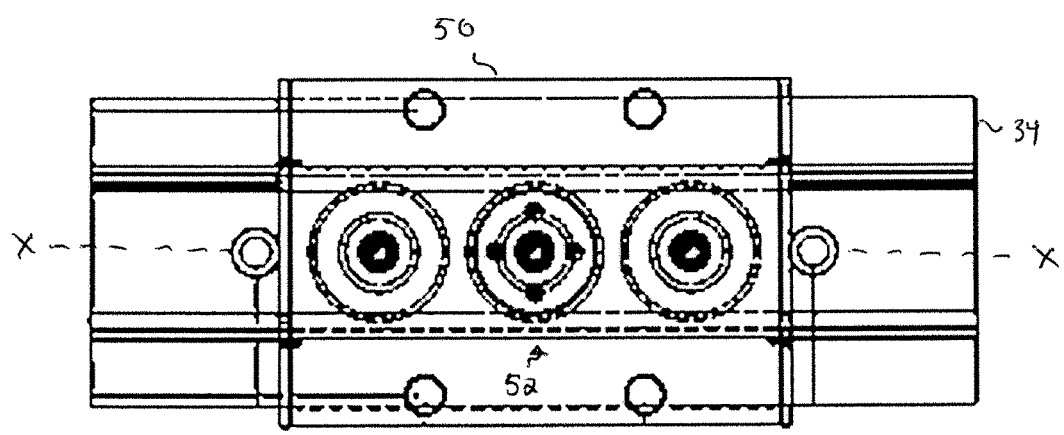
FIG. 13 is a top plan of a roller assembly for a pedestal for a valve operator system according to the present invention.

As explained above, valve operator head 14 is slidingly connected to arm 12, such as by track 34. For example, arm 12 may support track 34, which is preferably mounted to and extends along the upper surface 36 of arm 12 from end 16 proximate to mount 18 to a free end 38. Valve operator head 14 is interconnected to track 34 for sliding movement along the length of track 34 from mount end 16 to free end 38. As seen in FIG. 11, track 34 may be generally U-shaped and includes a base 42 and two opposing side rails 44 and 46. Each side rail 44 and 46 includes a rod 48 located along an interior surface thereof and extending longitudinally therewith the length of arm 12. As additionally seen in FIGS. 12 and 13, valve operator head 14 is mounted to track 34 via a pedestal 50 that interconnects head 14 to a roller assembly 52 having a series of roller that allow valve operator head 14 to roll along track 34 in either direction. For example, as seen in FIG. 13, rollers in roller assembly 52 may be staggered about a longitudinal axis X-X so that a central roller in roller assembly 52 engages rod 48 of one side rail 44, while two rollers in roller assembly 52 positioned on either side of central roller in roller assembly 52 engage rod 48 of opposing side rail 46. As seen in FIGS. 1 and 2, a removable stop 54 may be positioned at free end 38 of arm to allow for easy removal and insertion of rollers 52 between side rails 44 and 46, and to retain valve operator head 14 in track 34 after assembly and during use of valve operator head 14.

Referring again to FIGS. 1 and 2, a longitudinal plate 60 having a series of holes 62 formed therethrough is affixed to and extends outwardly from upper surface 36 of arm 12. Valve operator head 14 includes a corresponding pin 64 attached thereto, such as by a bracket 66. As discussed above with respect to pin 26 and corresponding holes 28 in plate 30, pin 64 is used to secure valve operator head 14 in a desired position along the length of arm 12 prior to operating a target valve. Similarly, pin 64 could be biased into the closed position, such as by a spring, to ensure that valve operator head 14 remains fixed in a particular closed position when unattended. In addition, the number and placement of holes 62 can be selected to define the desired scope of movement of valve operator head 14. Pin 64 may be withdrawn from holes 62 via manual operation, or automatically using a solenoid or similar actuator that can be controlled remotely so that a user does not have to be manually move pin 64. In lieu of pins, plate 30 could be fixed relative to arm 12 by any number of conventional systems, such as latches, clamps, pivoting.

Figure 14:
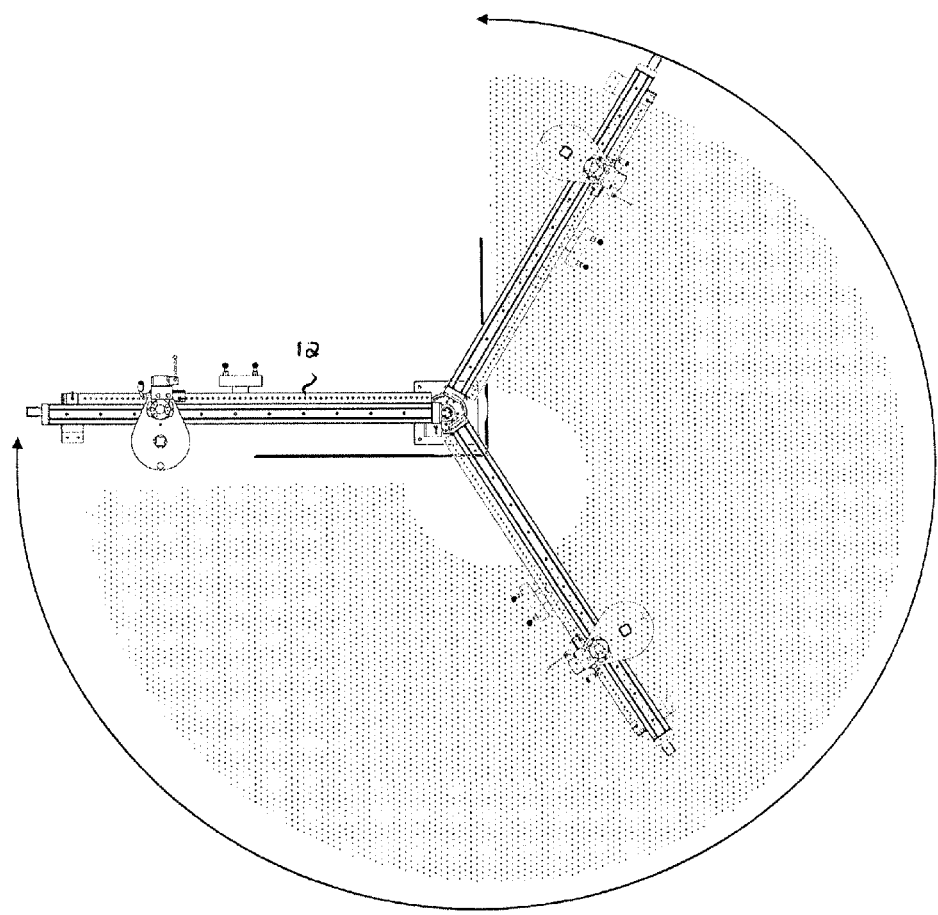
FIG. 14 is an schematic of the range of motion and valve accessibility for a valve operator system according to the present invention.
Figure 15:
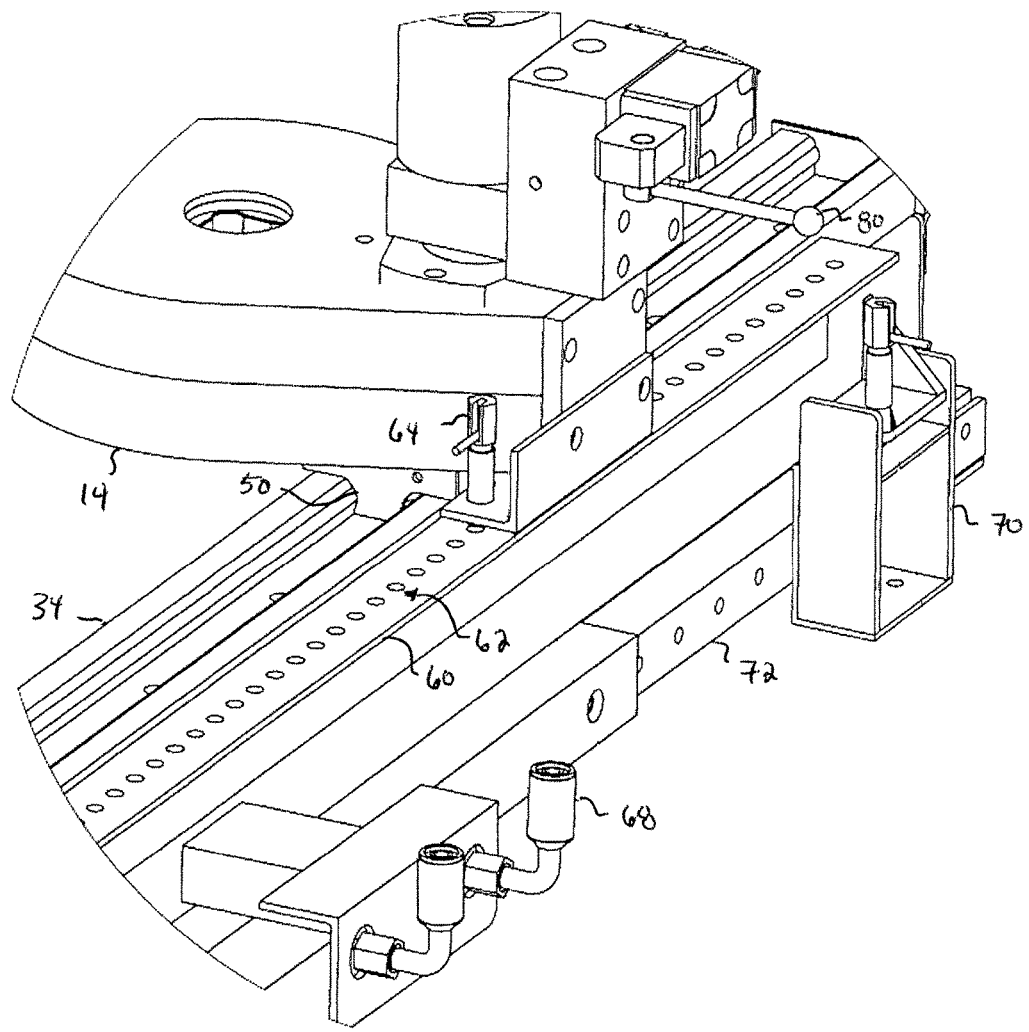
FIG. 15 is a perspective view of a valve operator head slidingly attached to a pivoting arm for a valve operator system according to the present invention.
Figure 16:
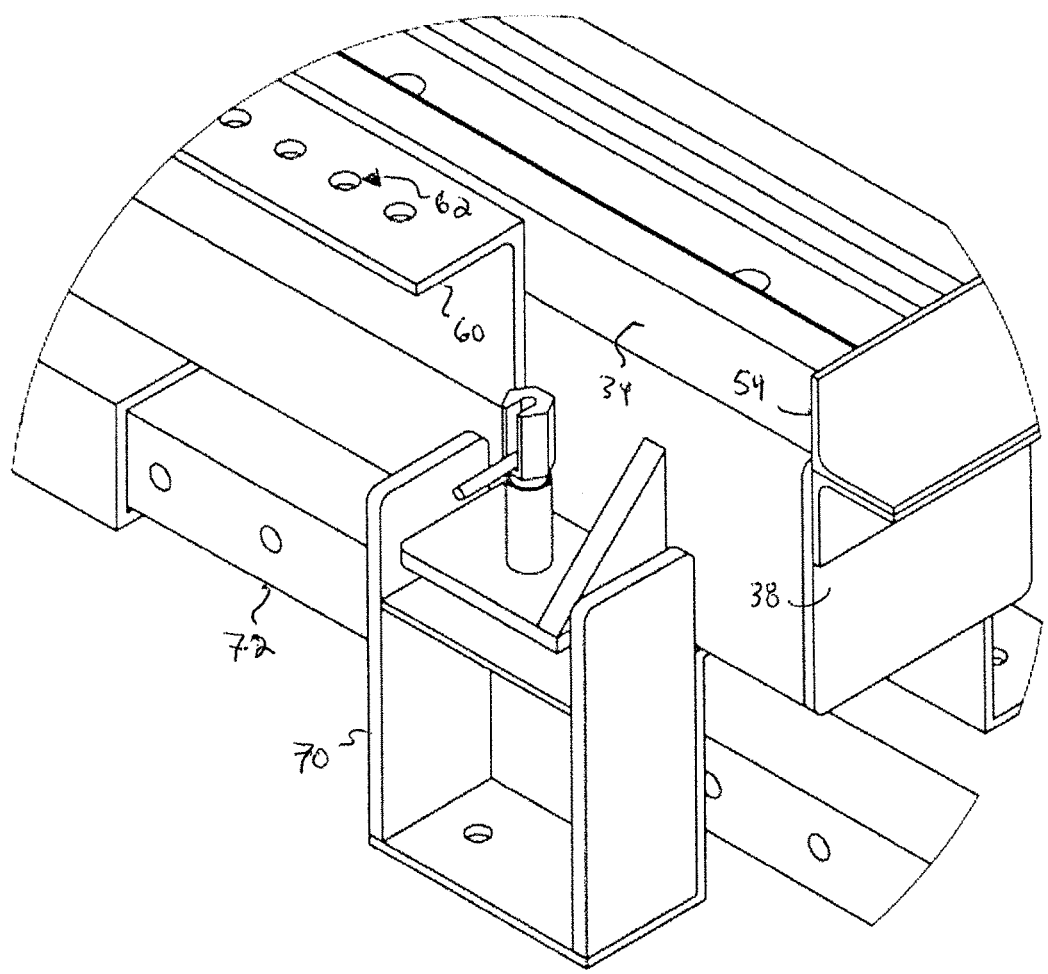
FIG. 16 is a perspective view of a valve key holder according to the present invention.

Because valve operator head 14 can be located at any point along arm 12, and arm 12 is free to pivot through an entire arc around mount 18, valve operator 14 can be positioned over any target valve within the length of arm 12 simply by swinging arm 12 into place and then sliding valve operator 14 along the length of arm 12 until it is over the target valve. For example, as seen in FIG. 14, if mount 18 is secured to the rear corner of the bed of a truck or other platform, valve operator 14 can be positioned over a target valve located anywhere within a 270 degree arc as described by arm 12 as it pivots around mount 18. Arm 12 may be located in the appropriate position by pivoting arm 12 to be above and slightly offset from the access point for a valve, and then sliding valve operator 14 so that it is above the access point of the valve. To assist with movement of arm 12, handles 68 may be affixed at any point along arm 12. Referring to FIGS. 15 and 16, arm 12 may include a holder 70 for mounting a valve key 72 to arm 12 so that valve key 72 can be coupled to valve operator head 14 and used to open and close the target valve as soon as valve operator head 14 is in position.

As further seen in FIGS. 1 and 2, valve operator head 14 includes a handle control 80 for controlling the torque applied to valve key 72 by valve operator head 14 as well as hydraulic coupling 82 for interconnecting a hydraulic system, such as one located on the vehicle to which mount 18 is affixed, and powering valve operator. Valve operator head 14 may further include a handle 84 for easy positing of head 14 over a target valve. Valve operator head 14 may also be equipped with revolution counters and torque read-out gauges.

Figure 17:
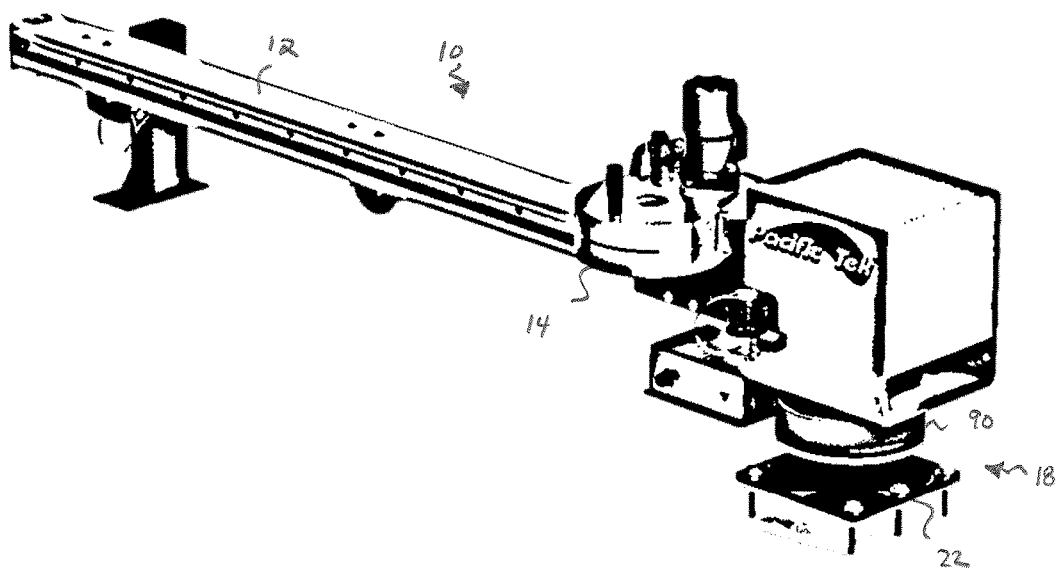
FIG. 17 is a perspective view of an alternative embodiment of a valve operator system according to the present invention.
Figure 18:
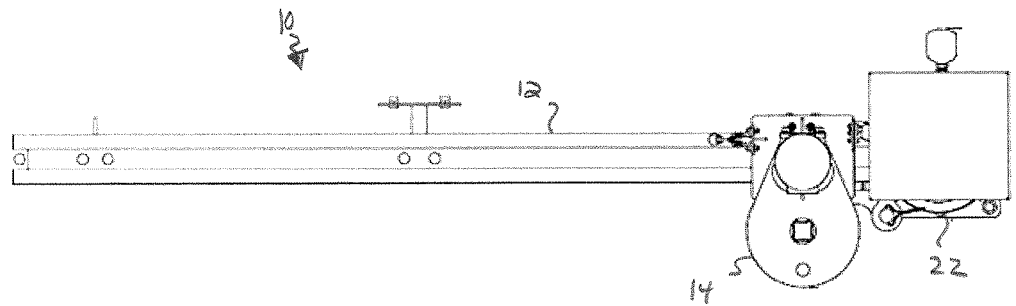
FIG. 18 is a top plan of an alternative embodiment of a valve operator system according to the present invention.
Figure 19:
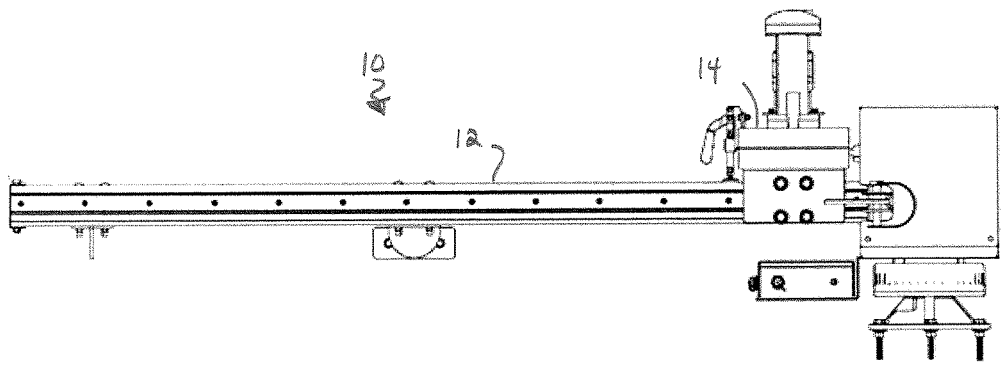
FIG. 19 is a side view of an alternative embodiment of a valve operator system according to the present invention.
Figure 20:
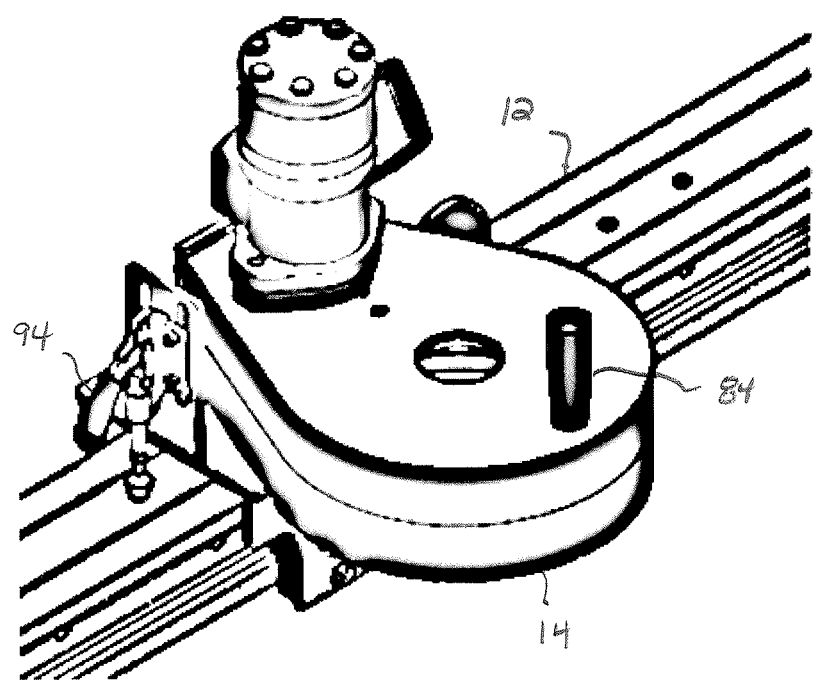
FIG. 20 is a schematic of an alternative embodiment of a valve operator system having a remote device in communication with the control panel of a valve operator head according to the present invention.
Figure 21:
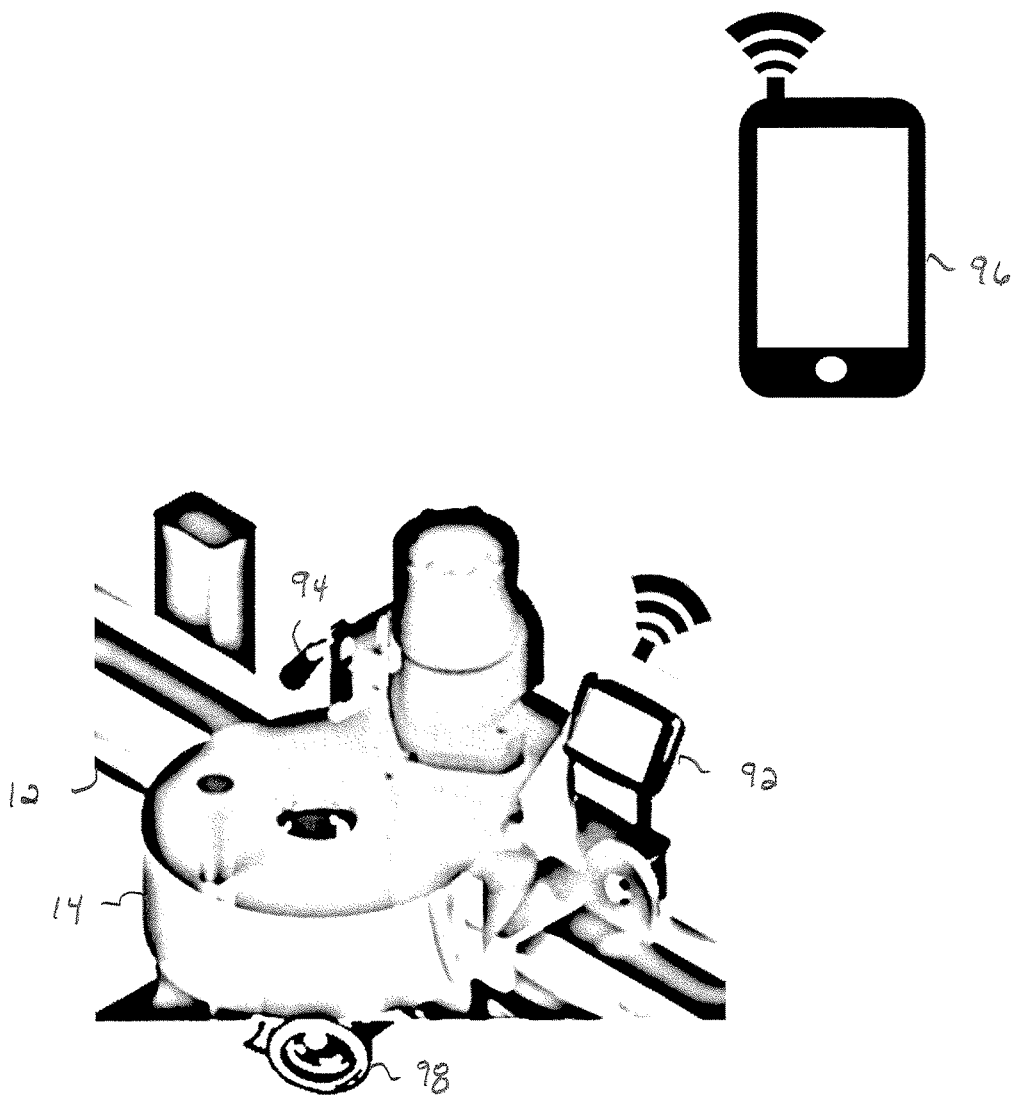
FIG. 21 is a schematic of a valve operator head with camera and remote connectivity according to the present invention.

Referring to FIGS. 17 through 19, an alternative embodiment of valve operating system 10 has mounting plate 22 of mount 18 supporting a drum brake 90 that interconnects central member 20 of arm 12 to mount 18. Arm 12 may thus be held in any particular position by electrically or hydraulically applying drum brake 90 and relocated by releasing drum brake 90. Valve operator head 14 further includes a control panel 92 for user input and feedback. Additionally, valve operator head 14 may be slidingly engaged using first and second roller assemblies 52 mounted thereto that engage first and second tracks 34 mounted on opposing sides of arm 12, respectively. This approach avoids the need for longitudinal plate 60 and corresponding pin 64 and provides resistance to torque forces generated when head 14 is operated. Referring to FIG. 20, valve operator head 14 may be locked into position along arm 12 using a locking bolt 94 that securely engages the upper surface of arm 12 in lieu of longitudinal plate 60 and corresponding pin 64.

Valve operator head 14 may further be equipped with a computer and Global Positioning System (GPS) to record the location of target valves, track operational data, and log and document all valve usage. Computer of head 14 may further be programmed to safely and effectively turn valves using American Water Works Association (AWWA) recommended procedures. This approach protects operators by allowing them to remain a safe distance from head 14 while exercising a valve and protects the valve by not assuming size, direction or current position. Head 14 may include sensor and be programmed to automatically stop valve rotation and reverse in half turn increments to flush calcification from the valve gate. This automation may exercise a valve at the minimum torque required to turn, then automatically lower preset threshold once rotation begins so the impact at end of valve travel is soft as possible.

Valve operator head 14 may be programmed to response to operator input via a "go/start" button on control panel 92 affixed to valve operator 14 or via a remote device 96 that communicates with head 14, as seen in FIG. 20, either wirelessly or via cables. Remote device 96 may be positioned proximately to head 14 or anywhere else in the vicinity, such as the cab of the truck to which valve operator system 10 is mounted. As further seen in FIG. 20, valve operator head 14 may include a camera 98 oriented to allow a user to properly position arm 12 above the desire location or view valve turning operations via on remote device 96. As should be understood by those of skill in the art, remote device 96 can comprise a smart phone, laptop computer, or computer installed in the cab of the truck to which valve operator system 10 is mounted.

Valve operator head 14 may automatically start its function with a setting of, for example, 50 foot pounds of torque. Valve operator head 14 then searches for the least resisted path to rotate the valve stem (clockwise or counterclockwise) and starts rotating in the least resisted direction (clockwise or counterclockwise). If valve operator head 14 hits a tough/calcified spot during rotation of the valve stem and is not able to move, it will reverse directional rotation one half of a turn, automatically increase torque setting by, for example, 50 foot pounds (for a total of 100 foot/pounds), then resume original directional rotation. If there is a second event of a tough/calcified spot in valve stem rotation, it will again reverse directional rotation one half of a turn, increase torque setting by an additional 50 foot pounds, for example, and then resume in the original directional rotation. This now puts the torque setting on the valve exerciser at, for example, 150 foot pounds. If there is a third time that valve operator head 14 hits a tough/calcified spot in the valve rotation, it will reverse direction three full rotations, automatically increase the torque setting an additional 50 foot pounds, for example, and then resume in the original directional rotation. This process may continue until valve operator head 14 reaches a pre-determined maximum established by the municipality or owner, such as 200 foot pounds of torque. A digital control panel may be used to query the operator whether he or she would like to turn the valve stem in the opposite rotational direction or increase torque beyond the maximum.

What is claimed is:

1. A valve operator system, comprising:
   a single arm extending along a central, longitudinal axis, wherein the single arm is pivotally attached to a mount and has two side surfaces facing outwardly relative to the axis;
   a first track positioned on one of the outwardly facing side surfaces of the single arm such that the first track faces outwardly relative the axis;
   a second track positioned on the other of the outwardly facing side surfaces of the single arm such that the second track faces outwardly relative the axis; and
   a valve operator head slidingly engaged with the first track and the second track.

2. The system of claim 1, further comprising a drum brake coupled to the single arm and the mount that can selectively prohibit pivoting of the single arm relative to the mount.

3. The system of claim 2, further comprising a locking bolt attached to the valve operator head and moveable between a first position where the locking bolt engages the single arm and a second position where the locking bolt is spaced apart from the single arm.

4. The system of claim 3, wherein the single arm is pivotal about the mount through a predetermined arc from a first position to a second position that is proximate to a target valve.

5. The system of claim 4, wherein the valve operator head may be slid along the first track and the second track on the arm from a first position to a second position above the target valve.

6. A method of operating a valve, comprising the steps of:
   providing a valve operator system comprising a single arm extending along a central, longitudinal axis, wherein the single arm is pivotally attached to a mount and has two side surfaces facing outwardly relative to the axis, a first track positioned on one of the outwardly facing side surfaces of the single arm such that the first track faces outwardly relative the axis, a second track positioned on the other of the outwardly facing side surfaces of the single arm such that the second track faces outwardly relative the axis, and a valve operator head slidingly engaged with the first track and the second track;
   positioning the valve operator system adjacent to the valve to be operated;
   pivoting the single arm until the single arm is positioned proximately to the valve;
   sliding the head along the first track and the second track of the single arm until the valve operator head is positioned above the valve; and
   using the valve operator head to operate the valve.

7. The method of claim 6, further comprising the step of locking the single arm in place relative to the mount after the single arm is positioned proximately to the valve.

8. The method of claim 7, further comprising the step of locking the valve operator head in place along the single arm after the head is positioned above the valve.

\* \* \* \* \*